(12) United States Patent
Dürsteler López et al.

(10) Patent No.: US 8,770,748 B2
(45) Date of Patent: Jul. 8, 2014

(54) PROCEDURE FOR DESIGNING A PROGRESSIVE OPHTHALMIC LENS AND CORRESPONDING LENS

(75) Inventors: Juan Carlos Dürsteler López, Castelldefels (ES); Javier Vegas Caballero, Barcelona (ES); Manuel Espinola Estepa, Barberá del Vallés (ES); Sara Chamadoira-Hermida, Gondomár (ES); Glòria Casanellas Peñalver, Barcelona (ES)

(73) Assignee: Indo Internacional S.A., Sant Cugat del Valles, Barcelona (ES)

( * ) Notice: Subject to any disclaimer, the term of this patent is extended or adjusted under 35 U.S.C. 154(b) by 49 days.

(21) Appl. No.: 13/373,240

(22) Filed: Nov. 9, 2011

(65) Prior Publication Data

US 2013/0114040 A1    May 9, 2013

(51) Int. Cl.
*G02C 7/06* (2006.01)
*G02C 7/02* (2006.01)

(52) U.S. Cl.
CPC .............. *G02C 7/066* (2013.01); *G02C 7/024* (2013.01)
USPC ................................ 351/159.42; 351/159.75

(58) Field of Classification Search
CPC ........ G02C 7/024; G02C 7/025; G02C 7/027; G02C 7/028; G02C 7/041; G02C 7/06; G02C 7/066
USPC .............. 351/159.06, 159.42, 159.74–159.77
See application file for complete search history.

(56) References Cited

U.S. PATENT DOCUMENTS

| | | | |
|---|---|---|---|
| 2002/0196410 A1* | 12/2002 | Menezes | 351/168 |
| 2003/0107705 A1 | 6/2003 | Zimmermann et al. | |
| 2008/0198325 A1* | 8/2008 | Bonnin et al. | 351/169 |
| 2011/0043754 A1 | 2/2011 | Hatanaka | |

FOREIGN PATENT DOCUMENTS

| | | |
|---|---|---|
| EP | 1 830 222 | 9/2007 |
| EP | 1 950 601 | 7/2008 |
| JP | 2004-163787 | 6/2004 |
| JP | 2 350 557 | 7/2010 |
| WO | WO 2009/135058 | 11/2009 |

* cited by examiner

*Primary Examiner* — Darryl J Collins
(74) *Attorney, Agent, or Firm* — Staas & Halsey LLP

(57) ABSTRACT

Method for designing a progressive ophthalmic lens with a top area between a vision area and a top edge of the lens, and a bottom area between a near vision area and a bottom edge of the lens. Selecting a predesigned lens, lateral aberrations which are redistributed around an outer area, defined according to a frame chosen by the lens user, so that at least on one of intersections between top, bottom and outer areas, the aberrations adopt values higher than those in the predesigned lens.

18 Claims, 5 Drawing Sheets

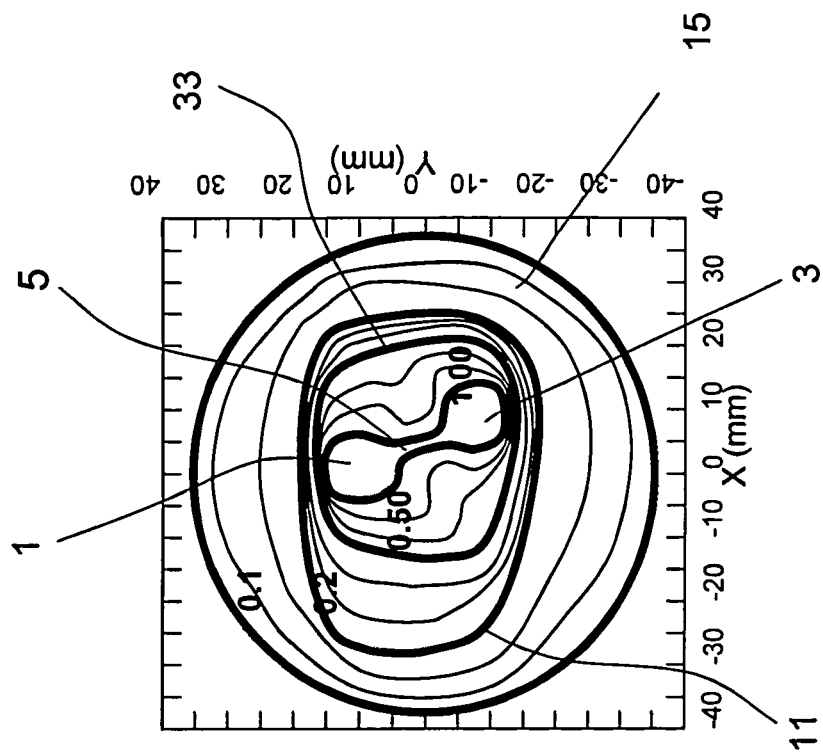
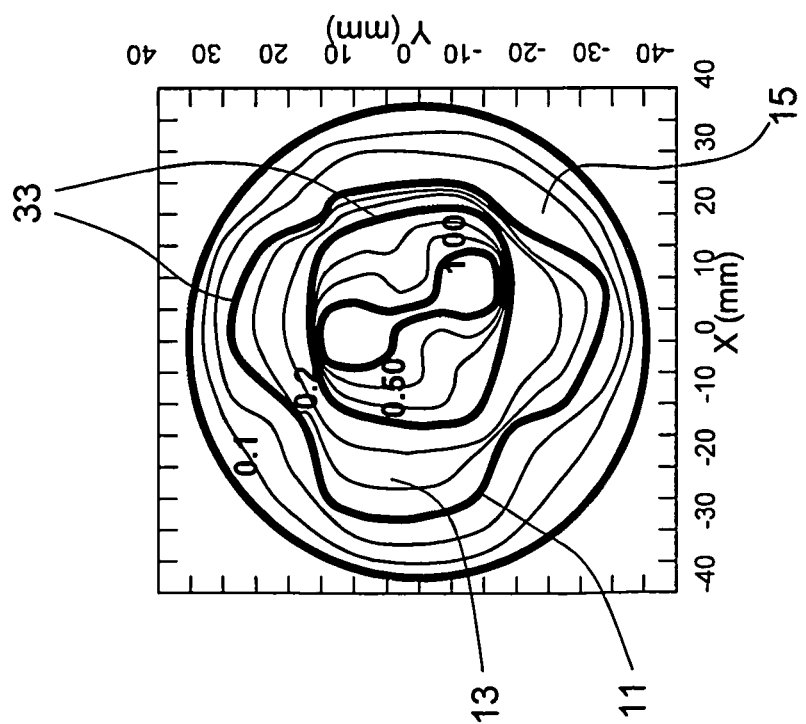
Fig. 4b
Fig. 4a

PROCEDURE FOR DESIGNING A PROGRESSIVE OPHTHALMIC LENS AND CORRESPONDING LENS

FIELD OF THE INVENTION

The invention relates to a procedure for designing a progressive ophthalmic lens, where the lens includes a far vision area, a near vision area and a passage that extends between both areas, where between the far vision area and the top edge of the lens there extends a top area and between the near vision area and the bottom edge of the lens there extends a bottom area. The procedure includes the following steps:
taking a user's physiological and prescription data,
selecting a frame,
taking the frame data, including the data of the frame perimeter, and
optionally taking the data of the lens position with respect to the user's eye, taking into account the selected frame.

The invention also relates to a finished progressive ophthalmic lens as shown and the corresponding bevelled progressive ophthalmic lens.

BACKGROUND

Progressive ophthalmic lenses are known to include far vision, near vision and passage areas. The far vision area and the near vision area have different powers and this causes the lens to contain optical aberrations that are typically distributed in the lateral areas on both sides of the power progression passage, which are inevitable and inherent to the fact that various differentiated optical powers exist. These optical aberrations, which are not desirable but inevitable, can, in a non-limiting way, be field curvature, oblique astigmatism, coma, etc. Various techniques exist for reducing and distributing these aberrations along the surface of the lens so that they affect the user as little as possible. In addition, it is possible that the user requires astigmatism correction. This astigmatic correction can also be included in the lens by so-called prescription astigmatism. Logically in the physical lens prescription astigmatism and said optical aberrations coexist in an overlapped state, but during the procedure for designing the lens these characteristics are treated in a differentiated way.

Thanks to existing optical aberration optimization techniques, preferably referring to the distribution of the lens power progression associated aberrations, such as oblique astigmatism, coma and field curvature, among others, greater comfort has been achieved for progressive lens users and, consequently, said lenses have become popular. In this application, the term "lateral aberrations" will apply to all those optical aberrations that are the result of progressive lens power progression, including, among others, oblique astigmatism, coma and field curvature.

It is known to take into account various physiological data, such as the frame chosen by the user, in the procedure of selecting the most suitable progressive lens for the user. For example, in certain cases, data are taken on the positioning of the lens with respect to the user's eye, taking into account the selected frame. Examples of this can be found in documents ES 2.253.391 and WO 2009/133887 A1.

Document EP 1.830.222 A1, EP 1.950.601 A1, JP 2004163787 A, and WO 2009/135058 A2 describe different procedures for manufacturing progressive lenses that take into account the frame chosen by the user.

However there is still the need to devise procedures that improve the treatment of optical aberrations present on lenses, and very particularly distributing power progression associated lateral aberrations.

In this application, the terminology of the ISO 13666 standard has been used, which establishes the following definitions:
semifinished lens blank: piece of preshaped material that only has one finished optical surface,
finished lens: lens where the two sides have finished optical surfaces, this finished lens can be bevelled (to adjust its perimeter to a particular frame) or not.

In this application, it is considered that the expression "finished lens" always relates to the unbevelled lens. For the bevelled lens the term "bevelled finished lens" is specifically used.

SUMMARY OF THE INVENTION

An aim of the invention is to overcome these drawbacks. This purpose is achieved a procedure of the type indicated at the beginning, including a lens optimization step having the following sub-steps:
calculating objective power and prescription astigmatism values for the far vision area, the near vision area and the passage, according to the user's physiological and prescription details and, optionally, the positioning data,
generating or selecting a predesigned lens, where the predesigned lens has certain lateral aberration values, preferably lens power progression associated astigmatism, in the top and bottom areas,
defining a useful area, defined according to the perimeter of the frame (and preferably including the area within the perimeter of the frame), and an outer area outside the useful area, and positioning the useful area in the lens (preferably taking into account the correct position of the lens with respect to the user's eye according to the user's morphology), where the useful area divides the top area into a top outer area and a top inner area, and the bottom area into a bottom outer area and a bottom inner area,
redistributing at least one of the lateral aberrations on the lens, preferably a lens power progression associated astigmatism aberration, where during the redistribution the aberration on the chosen lens is distributed around the outer area allowing, at least in one of the top outer and bottom outer areas, values to be adopted that are higher than those on the predesigned lens.

In this application, a predesigned lens is to be understood to be a lens that is taken as the starting point for the optimization step according to the invention. It is a lens that has been calculated by any method other than that indicated in this invention, preferably without taking into account the frame chosen by the user, and very preferably without taking into account the perimeter of the frame. The predesigned lens can have been calculated beforehand, so that the optician can have a plurality of predesigned lenses from which he can chose the most suitable one when performing the optimization according to the invention, or it can be a lens that is generated (calculated) when performing the optimizing according to the invention.

Effectively, usually conventional progressive lenses (and the predesigned lenses that are usually used in designing conventional progressive lenses) have been calculated without taking into account the frame that will be used by the user. Consequently, the exact location of the useful area is not known. As a result, conventional lenses (and conventional predesigned lenses) try to maintain the top and bottom areas with lateral aberration values, particularly for progression associated astigmatism, as low as possible since the whole of that part of said top and bottom areas that in the end remains inside the useful area will be an area used frequently by the user, and it is unknown beforehand what size this will be, and so it is necessary to extend said areas to the total diameter of the lens in order to cover any possible frame shape. Therefore, the existence of lateral aberrations with noticeable values in these areas would be a source of discomfort for the user if in the end they remain within the perimeter of the user's frame. However, in this invention it is taken into account that, whereas in the top inner and bottom inner areas the presence of lateral aberrations is highly inadvisable (and must be reduced to a minimum), on the other hand in the top outer and bottom outer areas any value of lateral aberrations is possible (and, in fact, any aberration) since in the end these areas will be eliminated during the bevelling, and so their optical properties are totally irrelevant. On the other hand, when redistributing the lateral aberrations (preferably the distribution of progression associated astigmatism) by allowing the top outer and bottom outer areas to adopt values higher than those on the predesigned lens it is possible to achieve that in other parts of the lens, specifically within the useful area, the values of the lateral aberrations are reduced and/or softened, which improves user comfort.

It is not necessary that the optimization process simultaneously affects both areas (the top outer and bottom outer areas), as there may be an optimization that only affects one of them.

Generally, the optimization can include treating one of the lateral aberrations (preferably the lens power progression associated astigmatism) or more than one. Therefore, when referencing the chosen lateral aberration in this application, it must be understood to also include cases where more than one lateral aberration has been chosen.

Preferably the chosen lateral aberration is redistributed via a redistribution process wherein a non null objective value of the chosen lateral aberration is defined for at least one of the top outer and bottom outer areas, with the objective value preferably being between 30% and 70% of the maximum value present in the useful area for said lateral aberration, and very preferably between 40% and 60% of the maximum value present in the useful area for said lateral aberration. Effectively, as already mentioned, the usual procedures try to make the lateral aberrations as small as possible in the top and bottom areas, and so the objective values are usually 0. Also, in conventional procedures the top and bottom areas are not divided according to the frame (which, when defining the useful area, divides them into top outer, top inner, bottom outer and bottom inner), and so there is not a differentiated treatment of these sub areas. When a predesigned lens is selected, these 4 areas have lateral aberration values that are null or very small. When non null objective values (or even clearly high values) are fixed to the outer areas (top outer and/or bottom outer) a redistribution of the lateral aberrations is forced around the whole lens, obtaining a reduction and softening of the lateral aberrations in the useful area, particularly in the temporal and nasal area.

Advantageously, in the optimization process initial parameters are established that include objective power values, objective chosen lateral aberration values, power and chosen lateral aberration tolerance values and a weight function, where the optimization process is carried out using a merit function, where, for the outer area, chosen lateral aberration tolerances are established that are greater than the chosen lateral aberration tolerances envisaged in the useful area. Effectively, allowing greater tolerances in the outer area allows the chosen lateral aberration to be redistributed along the outer area "freely". Conceptually, the ideal situation would be that the tolerances in the outer area were infinite, but to avoid numerical calculation problems, the infinite value is replaced with a value that is high enough to achieve the desired effect.

Preferably weight function values are established for the outer area that are smaller than for the useful area, preferably less than 0.2, and more preferably less than 0.1. Effectively, this way the weight function does not take into account (or does so only slightly) what occurs in the outer area. Ideally, the weight function has a value 0 in the outer area, but again for calculation purposes, it is preferable that the value is not exactly 0, and so it is replaced with a value that is small enough to achieve the desired effect (that what happens in the outer area is not important for the merit function). Preferably the weight function values are between 0 and 1, in which case the weight function values in the outer area are smaller than 0.2, or even smaller than 0.1.

Advantageously, in the optimization process a shifting step is performed of at least one of the nasal and temporal maximums of lens power progression associated astigmatism, that is present in the predesigned lens, moving it away from the far vision and near vision areas and passage. Effectively, both maximums (nasal and temporal) are present in conventional progressive ophthalmic lenses. As already mentioned above, predesigned lenses are calculated without taking into account any frame, and so it frequently occurs that these maximums remain within the useful area. This invention proposes moving them away from the far vision and near vision areas and passage, in other words, separate them to the right and left, bringing them closer to the respective nasal and temporal edges. Preferably these maximums are shifted by localized changes in the spline surfaces that describe the objective progression astigmatism and which include said maximums. Ideally the maximums are shifted until they reach the edge of the useful area. However, again for calculation purposes, it is advantageous that the maximum is not exactly on the edge of the useful area (to avoid calculation singularities), and instead it is advantageous that the maximum coincides substantially with the perimeter of the useful area. Substantially means that it is sufficiently close so that being any closer does not mean improving the distribution of the progression associated astigmatism that is noticeable to the user.

It is not essential that both maximums are shifted simultaneously, but rather that the procedure can include shifting only one of the maximums.

Alternatively, the perimeter of the useful area (which is the perimeter of the frame chosen by the user) can be replaced with nasal and temporal benchmarks of the useful area perimeter, and at least one of the maximums is shifted until it coincides substantially with its respective nasal or temporal benchmark, respectively. Effectively, using these benchmarks simplifies the calculation and makes it possible to obtain satisfactory results.

Shifting the maximums locally affects the distribution of powers and progression derived astigmatisms. Preferably these changes are obliged not to affect the distributions of power and progression associated astigmatism in the far vision and near vision areas and passage.

Preferably an ellipse of vision is defined. The ellipse of vision is the section of the useful area that has greater ocular transit and, therefore, it is the section that is used most by the user. Logically, it includes the far and near vision areas and passage. Preferably it is centered in the prism control point. Preferably its semi axes are calculated from the users gazing angles and vertex distance. Preferably it is considered that the vertex distance is between 24 and 32 mm (very preferably between 27 and 29 mm). Preferably it is considered that the vertical gazing angle is between 35° and 45° (very preferably between 38° and 42°), and that the horizontal gazing angle is between 25° and 35° (very preferably between 28° and 32°). A particularly advantageous solution is obtained when the larger semi axis is 23 mm (corresponding to a gazing angle of 40° with respect to the centre of the user's eye and considering a vertex distance of 28 mm) and the smaller semi axis is 16 mm (corresponding to a gazing angle of 30° with respect to the centre of the user's eye and with the same vertex distance of 28 mm). This ellipse of vision is used to give the corresponding area a "favorable treatment", in the sense that worse optical characteristics are required of it than of the far and near vision areas and passage, but better ones than the rest of the useful area. Preferably this is done by assigning higher weight function values to it than to the rest of the useful area.

The invention also relates to a finished progressive ophthalmic lens, where the lens includes a far vision area, a near vision area and a passage that extends between the far vision area and the near vision area, where between the far vision area at the top edge of the lens there extends a top area, and between the near vision area and the bottom edge of the lens there extends a bottom area. The lens includes a useful area, defined according to the perimeter of a certain preselected frame, and preferably having the area within the perimeter of the frame, and an outer area outside the useful area, where the useful area divides the top area into a top outer area and a top inner area and the bottom area into a bottom outer area and a bottom inner area, where in at least one of the top outer and bottom outer areas there is a lens power progression associated astigmatism greater than 0.25 Dp.

Preferably the top inner and bottom inner areas have a lens power progression associated astigmatism less than 0.12, preferably less than 0.06.

BRIEF DESCRIPTION OF THE DRAWINGS

Other advantages and characteristics of the invention will be appreciated from the following description, wherein, in a non-limiting manner, preferable embodiments of the invention are described, with reference to the accompanying drawings, wherein:

FIGS. 4a and 4b, distribution maps of the weight functions according to the invention.

DESCRIPTION OF EMBODIMENTS

Figure 1:
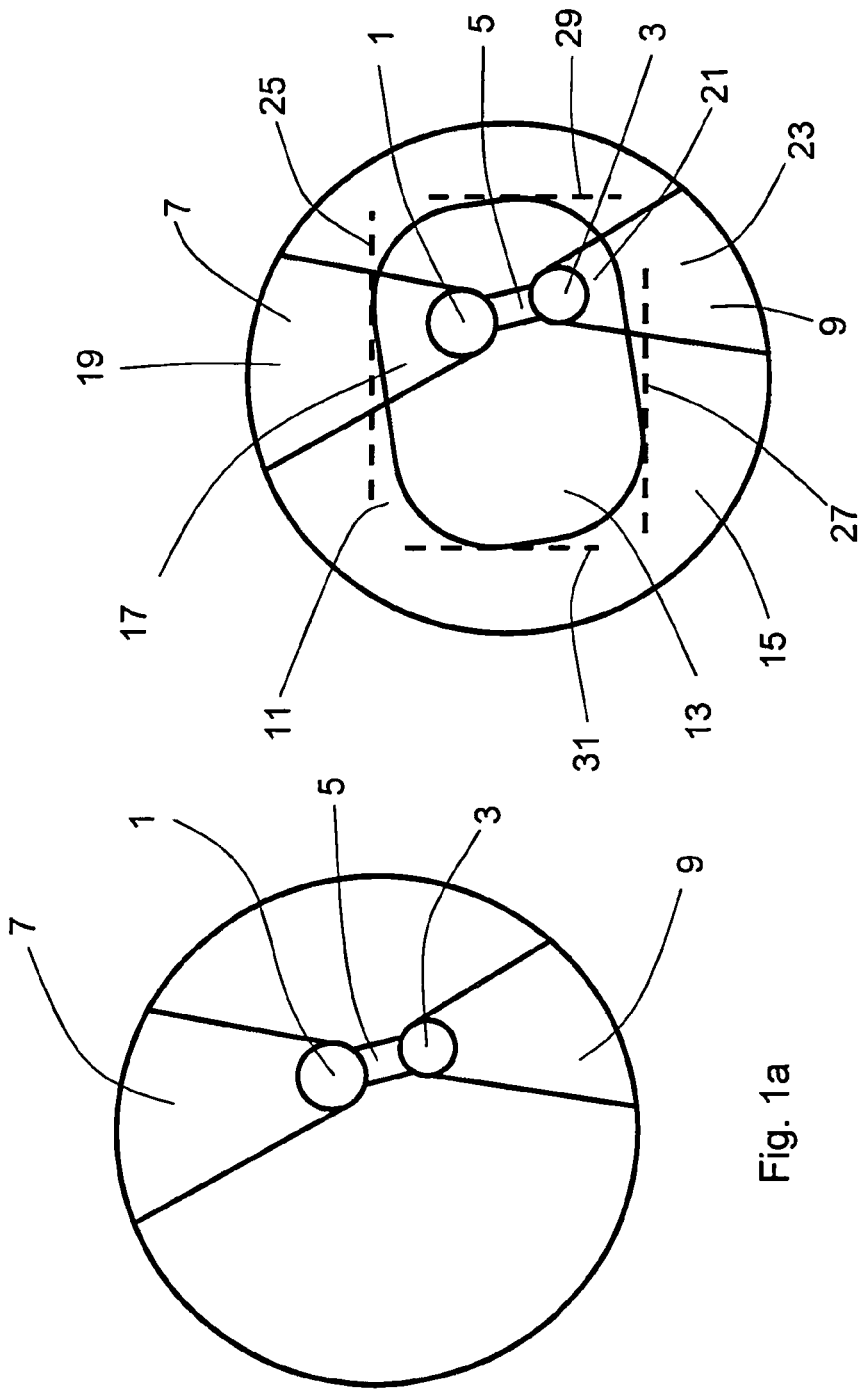
FIGS. 1a and 1b, diagrams of progressive ophthalmic lenses with the various areas identified.

In this application various parts of a finished progressive ophthalmic lens are mentioned. FIGS. 1a and 1b diagrammatically show each one of them.

FIG. 1a shows the areas of far vision 1, near vision 3 and passage or corridor 5, which are the conventional areas of state of the art progressive lenses. Above the far vision area 1 there extends a top area 7, and under the near vision area 3 there extends the bottom area 9.

FIG. 1b includes the perimeter 11 of a frame which, once positioned adequately on the lens, defines a useful area 13 and an outer area 15, which is the area that will be removed during the bevelling step. The part of top area 7 included in useful area 13 is top inner area 17, whereas the part of top area 7 included in outer area 15 is top outer area 19. Similarly bottom inner area 21 and bottom outer area 23 can be defined. In addition, FIG. 1b shows, in dashes, the lines determining the top, bottom, nasal and temporal maximums, in other words the top 25, bottom 27, nasal 29 and temporal 31 benchmarks in useful area 13.

Figure 2:
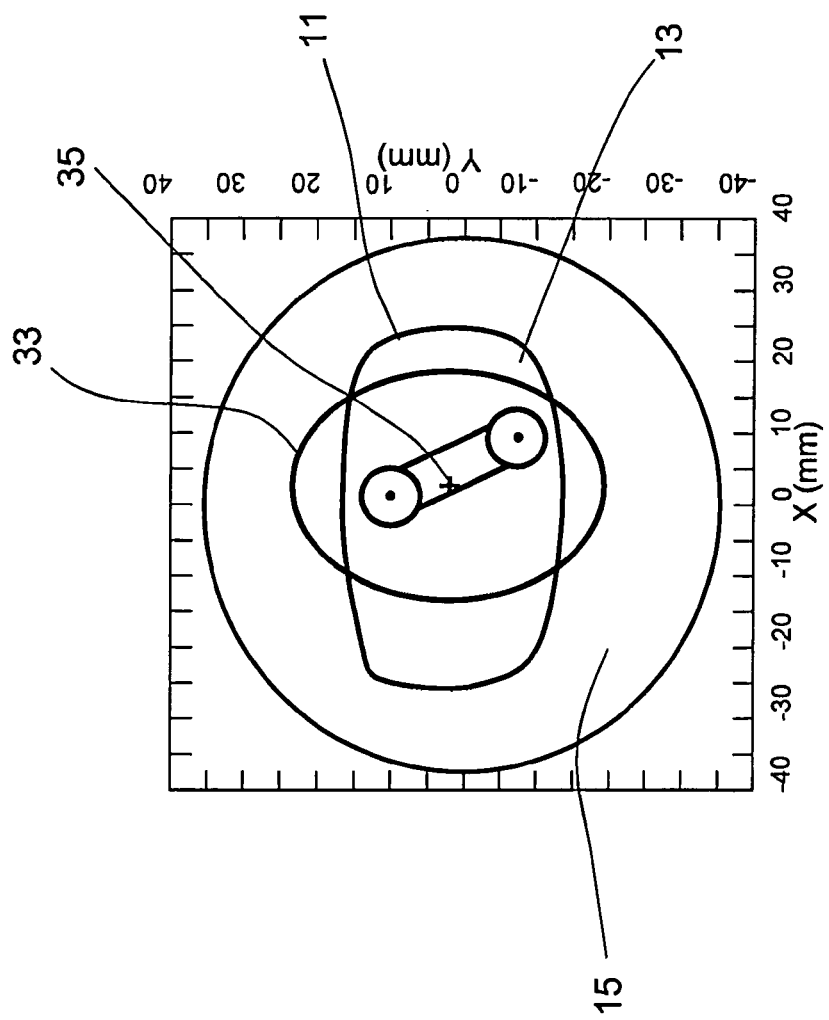
FIG. 2, a diagram of a progressive ophthalmic lens with the perimeter of the frame and the ellipse of vision.

FIG. 2 shows another example of an ophthalmic lens with a useful area 13 defined by the frame, in which the ellipse of vision 33 has been included. The shape of useful area 13 generally coincides with the surface defined by perimeter 11 of the frame, but it does not have to be that way. Useful area 13 can have other geometries which, although they are defined by perimeter 11 of the frame, do not coincide exactly. So, for example, it is possible to define useful area 13 as that defined by the rectangle formed by top 25, bottom 27, nasal 29 and temporal 31 benchmarks. Or it is possible to define the useful area as some other simple geometric shape that is close to the area of perimeter 11 (inscribed rectangles, inscribed ellipses, etc.). These simple geometries can be interesting in various cases, such as for example for simplifying and accelerating the optimization calculations or for performing the optimization in those cases where the frame perimeter data are incomplete.

As already mentioned above, the basic aim of the invention is to avail of the area that will remain outside the frame (in other words, outer area 15) once the lens has been bevelled. This way lenses with less lateral aberrations (and, in particular, with less progression associated astigmatism) can be obtained, because they are made more comfortable for users regardless of the type of progressive design chosen, which will not vary in the areas that are important for vision (far vision area 1, near vision area 3 and passage 5).

The examples in FIGS. 3a, 3b, 3c, 5a and 5b show cases where the chosen lateral aberration is progression associated astigmatism. However, the results and conclusions can be generalized to any other lateral aberration.

Figures 3A, 3B, 3C:
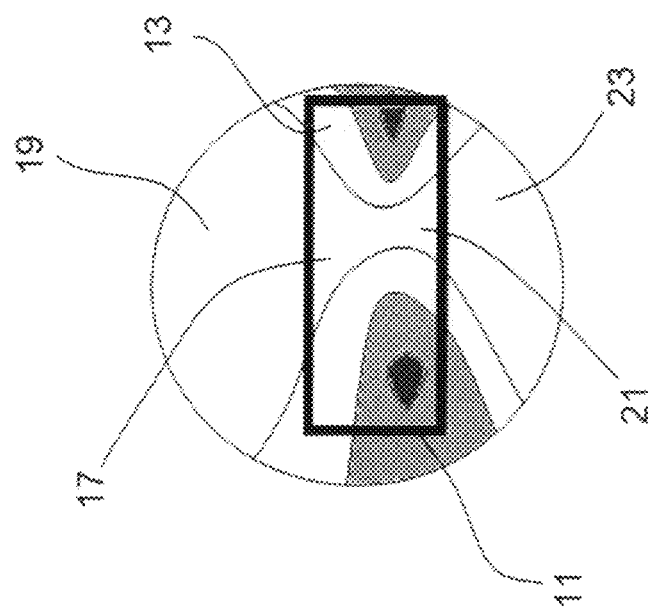
FIGS. 3a, 3b and 3c, diagrammatic views of some distribution maps of progression associated astigmatism, such as examples of lateral aberrations, showing the movement of the progression associated astigmatism according to the procedure of the invention.

FIG. 3a shows the progression associated astigmatism of a standard design. Perimeter 11 of the frame chosen by the user, represented diagrammatically by a rectangle, has been marked on the finished lens. It can be seen that there are large areas with zero astigmatism or nearly zero, which in the end will be eliminated during the bevelling operation. Given that when designing the progressive lens the frame finally chosen by the user is not known and given that the areas above far vision area 1 and under near vision area 3 can be very important optically (since, if they remain within perimeter 11 of the frame they will be areas used frequently by the user), conventional progressive lens design techniques tend to keep top area 7 and bottom area 9 with the least astigmatism possible and, generally, with the smallest aberrations possible. However, in reality, an important part of these top 7 and bottom 9 areas will be eliminated during the bevelling, in particular top outer 19 and bottom outer 23 areas. Consequently, conventional progressive lens design techniques are conditioned by trying to optimize the optical properties of areas that will be eliminated subsequently. The procedure of this invention provides an improvement by distinguishing between useful area 13 and outer area 15.

This way, in this example, during the procedure according to the invention progression associated astigmatisms are redistributed as shown in FIG. 3b. In other words, top outer area 19 and bottom outer area 23 are "invaded" with astigmatism which leads to a reduction in the maximum astigmatism values present in useful area 13. Given that in the end only useful area 13 will remain, the overall result is a bevelled lens with smaller astigmatic aberrations caused by progression. This is shown in FIG. 3c.

The methodology used is as follows:

First of all, based on the physiological data of the user and the frame chosen by the user, a set of distances and values is determined which preferably now includes the correct positioning of the lens with respect to the eye taking into account the morphology of the user and the frame.

Then the top 25, bottom 27, nasal 29 and temporal 31 benchmarks of useful area 13 are determined, together with the now conventional data, such as for example the positions of near vision 3 and far vision 1 areas, and passage 5. Also the value and position of the ellipse of vision 33 are determined, centered in the prism control point 35.

Objective power and prescription astigmatism values are determined for far vision area 1, near vision area 3 and passage 5 according to the previous data.

A predesigned lens is generated or selected that is a good starting point for the optimization process.

With all the above information the initial values are determined for the optimization process. In particular, progression associated astigmatism and objective power values are determined as well as progression associated astigmatism and objective power tolerance values. Preferably the permitted progression associated astigmatism (as objective value) in top outer 19 and bottom outer 23 areas is between 40% and 60% of the maximum progression associated astigmatism present in useful area 13. As for the progression associated astigmatism tolerances, preferably a tolerance of between 80% and 120% above the maximum permitted tolerance in useful area 13 is admissible. In addition, the areas that have 0 dioptres (Dp) as the objective value of progression associated astigmatism are preferably assigned a tolerance of 0.06 Dp. Also the weight function is determined, preferably taking into account the ellipse of vision 33. Preferably the shifting step of the nasal and temporal maximums of progression associated astigmatism is performed. This is done preferably by introducing changes in the control points of the spline surfaces that define the surrounds of the maximums, so that localized changes are generated that shift these maximums, but which do not affect the optical properties of the lens in its central sections, particularly in near vision 3 and far vision 1 areas and passage 5.

Then the progression associated astigmatism is redistributed, as mentioned above.

Once the surface to be machined has been determined by means of the optimizing process, said surface is machined (usually it is the concave surface of the lens) to thus obtain the finished progressive ophthalmic lens. Finally the lens can be bevelled to thus obtain the end product suitable for being mounted in the frame.

FIG. 4a shows a distribution map of weights according to the invention. According to a preferred embodiment of the invention, the weight function values range from 0 to 1. It is possible to approximately recognize the various areas of the lens, such as the far vision 3 and near vision 1 areas, and the passage 5, the perimeter 11 of the frame and the ellipse of vision 33. In this particular example, the part of outer area 15 that remains within ellipse of vision 33 has a greater weight than the other parts of outer area 15. Although, as already mentioned, this part of the ellipse of vision 33 will be eliminated in the end, nevertheless, by giving it a greater weight than the rest of outer area 15, it is possible in certain cases to obtain better results in useful area 13 (and/or greater processing speed). Also it is observed that the intersection of useful area 13 with the ellipse of vision 33 has a greater weight than the other parts of useful area 13. Finally it can be observed how near vision 3 and far vision 1 areas and passage 5 are assigned the greater weight. In FIG. 4b another weights distribution map can be observed in which perimeter 11 defines the area of the lens on its own with a weight less than 0.2.

Figure 5B:
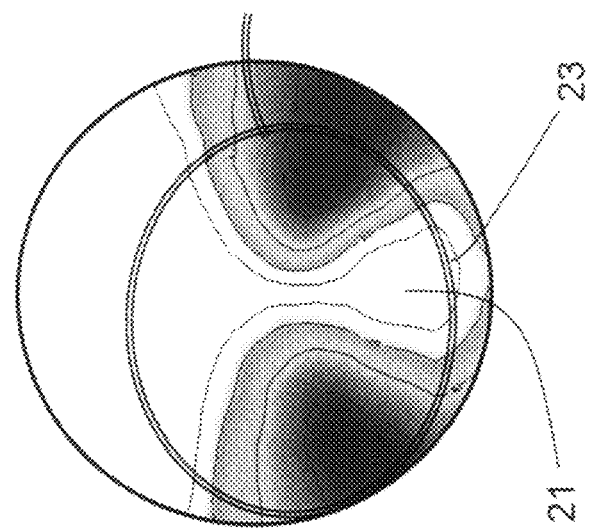
FIGS. 5a and 5b, the distribution map of the progression associated astigmatism of a progressive ophthalmic lens before and after applying the optimizing procedure according to the invention.
Figure 5A:
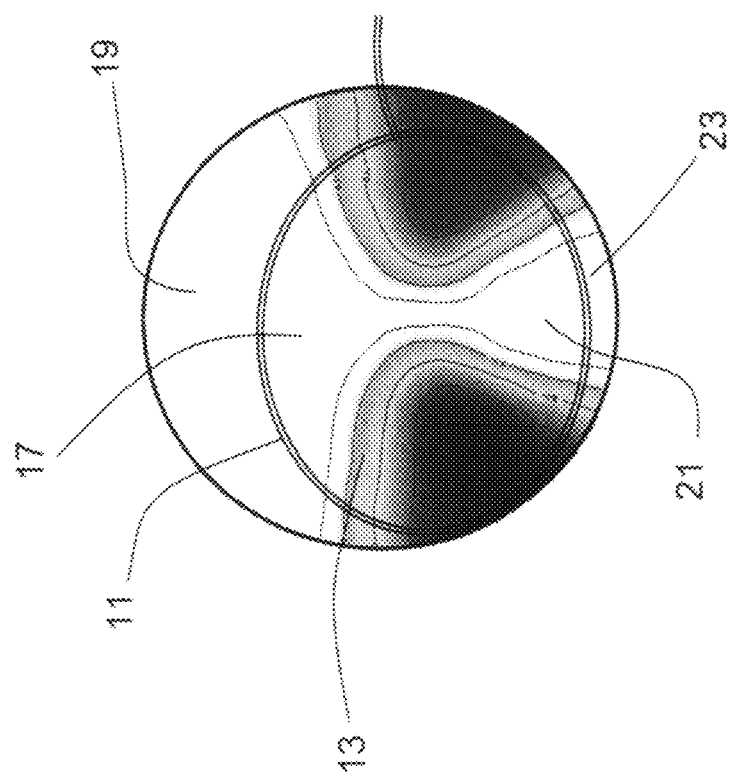

FIGS. 5a and 5b show a comparative example between a distribution map of astigmatisms in a conventional lens, over which perimeter 11 of the frame chosen by the user (FIG. 5a) has been superimposed and a distribution map of astigmatisms in a lens according to the invention (FIG. 5b). In this particular case during the optimization, the astigmatism has only been redistributed around bottom outer area 23. Comparing both maps it can be observed that useful area 13 designed according to the invention has smaller progression associated astigmatism values and a softer distribution of said values.

The invention claimed is:

1. A progressive ophthalmic lens, comprising:
a far vision area, a near vision area and a passage that extends between said far vision area and said near vision area,
wherein between said far vision area and a top edge of said progressive lens there extends a top area and between said near vision area and a bottom edge of said lens there extends a bottom area;
a useful area, defined according to a perimeter of a preselected frame, and an area between the perimeter and an outer area outside the useful area,
wherein said useful area divides said top area into a top outer area and a top inner area and said bottom area into a bottom outer area and a bottom inner area, and
wherein in at least one of said top outer and bottom outer areas there is an arch of a contour line of a lens power progression associated astigmatism of value 0.25 Dp that extends along the corresponding top outer and bottom outer areas between two points of the frame perimeter.

2. Lens according to claim 1, wherein the top inner and bottom inner areas have a lens power progression associated astigmatism less than 0.12.

3. Lens according to claim 1, wherein the top inner and bottom inner areas have a lens power progression associated astigmatism less than 0.06.

4. Method for designing a progressive ophthalmic lens, where said lens includes a far vision area, a near vision area and a passage which extends between said far vision area and said near vision area, where between said far vision area and a top edge of said lens there extends a top area and between said near vision area and a bottom edge of said lens there extends a bottom area, comprising the following steps:
taking a user's physiological and prescription data,
selecting a frame,
obtaining the frame's perimeter,
optimizing the lens, by:

calculating objective power and prescription astigmatism values for the far vision area, the near vision area and the passage, according to the user's physiological and prescription data, generating or selecting a predesigned lens having certain lateral aberration values, in the top and bottom areas, defining a useful area according to the perimeter of the frame, and an outer area outside the useful area, positioning the useful area in the lens where the useful area divides the top area into a top outer area and a top inner area, and the bottom area into a bottom outer area and a bottom inner area, redistributing at least one of the lateral aberrations on the lens around the outer area allowing, at least in one of the top outer and bottom outer areas, values to be adopted that are higher than those on the predesigned lens; and taking data of a position of the lens with respect to the user's eye based on the selected frame.

5. Method according to claim 4, wherein the calculating is done according to the user's physiological and prescription details and the position data.

6. Method for designing a progressive ophthalmic lens, where said lens includes a far vision area, a near vision area and a passage which extends between said far vision area and said near vision area, where between said far vision area and a top edge of said lens there extends a top area and between said near vision area and a bottom edge of said lens there extends a bottom area, comprising the following steps:

taking a user's physiological and prescription data,
selecting a frame,
obtaining the frame's perimeter,
optimizing the lens, by:
calculating objective power and prescription astigmatism values for the far vision area, the near vision area and the passage, according to the user's physiological and prescription data, generating or selecting a predesigned lens having certain lateral aberration values, in the top and bottom areas, defining a useful area according to the perimeter of the frame, and an outer area outside the useful area, positioning the useful area in the lens where the useful area divides the top area into a top outer area and a top inner area, and the bottom area into a bottom outer area and a bottom inner area, and redistributing at least one of the lateral aberrations on the lens around the outer area allowing, at least in one of the top outer and bottom outer areas, values to be adopted that are higher than those on the predesigned lens, wherein the redistributing is done by establishing a non null objective value of said lateral aberration for at least one of said top outer and bottom outer areas.

7. Method according to claim 6, wherein said lateral aberration is a lens power progression associated astigmatism.

8. Method according to claim 6, wherein an objective value of said lateral aberration is between 30% and 70% of a maximum value of said lateral aberration present in said useful area.

9. Method according to claim 8, wherein an objective value of said lateral aberration is between 40% and 60% of the maximum value of said lateral aberration present in said useful area.

10. Method for designing a progressive ophthalmic lens, where said lens includes a far vision area, a near vision area and a passage which extends between said far vision area and said near vision area, where between said far vision area and a top edge of said lens there extends a top area and between said near vision area and a bottom edge of said lens there extends a bottom area, comprising the following steps:

taking a user's physiological and prescription data,
selecting a frame,
obtaining the frame's perimeter,
optimizing the lens, by:
calculating objective power and prescription astigmatism values for the far vision area, the near vision area and the passage, according to the user's physiological and prescription data, generating or selecting a predesigned lens having certain lateral aberration values, in the top and bottom areas, defining a useful area according to the perimeter of the frame, and an outer area outside the useful area, positioning the useful area in the lens where the useful area divides the top area into a top outer area and a top inner area, and the bottom area into a bottom outer area and a bottom inner area, redistributing at least one of the lateral aberrations on the lens around the outer area allowing, at least in one of the top outer and bottom outer areas, values to be adopted that are higher than those on the predesigned lens; and wherein said optimizing further includes establishing initial parameters including objective power values, objective values of said lateral aberration, power and lateral aberration tolerance values and a weight function; and wherein said optimizing is carried out via a merit function, where, for said outer area, tolerances of said lateral aberration are established that are greater than tolerances of said lateral aberration for said useful area.

11. Method according to claim 10, wherein for said outer area, smaller weight function values are established than for said useful area.

12. Method according to claim 11, wherein, for said outer area, normalized values are established smaller than 0.2.

13. Method according to claim 12, wherein, for said outer area, normalized values are established less than 0.1.

14. Method for designing a progressive ophthalmic lens, where said lens includes a far vision area, a near vision area and a passage which extends between said far vision area and said near vision area, where between said far vision area and a top edge of said lens there extends a top area and between said near vision area and a bottom edge of said lens there extends a bottom area, comprising the following steps:

taking a user's physiological and prescription data,
selecting a frame,
obtaining the frame's perimeter,
optimizing the lens, by:
calculating objective power and prescription astigmatism values for the far vision area, the near vision area and the passage, according to the user's physiological and prescription data, generating or selecting a predesigned lens having certain lateral aberration values, in the top and bottom areas, defining a useful area according to the perimeter of the frame, and an outer area outside the useful area, positioning the useful area in the lens where the useful area divides the top area into a top outer area and a top inner area, and the bottom area into a bottom outer area and a bottom inner area, and redistributing at least one of the lateral aberrations on the lens around the outer area allowing, at least in one of the top outer and bottom outer areas, values to be adopted that are higher than those on the predesigned lens, wherein the optimizing includes shifting at least one of nasal and temporal maximums of progression associated astigmatism present in said predesigned lens by moving said at least one nasal and temporal maximums away from said far vision and near vision areas and said passage, and wherein, at least one of said nasal and temporal maximums is shifted until said at least one nasal and temporal maximums substantially coincides with said perimeter.

15. Method according to claim 14, wherein nasal and temporal benchmarks are defined, and at least one of said nasal and temporal maximums is shifted until said at least one of said nasal and temporal maximums substantially coincides with a respective nasal or temporal benchmark.

16. Method for designing a progressive ophthalmic lens, where said lens includes a far vision area, a near vision area and a passage which extends between said far vision area and said near vision area, where between said far vision area and a top edge of said lens there extends a top area and between said near vision area and a bottom edge of said lens there extends a bottom area, comprising the following steps:

taking a user's physiological and prescription data,
selecting a frame,
obtaining the frame's perimeter,
optimizing the lens, by:
calculating objective power and prescription astigmatism values for the far vision area, the near vision area and the passage, according to the user's physiological and prescription data,
generating or selecting a predesigned lens having certain lateral aberration values, in the top and bottom areas,
defining a useful area according to the perimeter of the frame, and an outer area outside the useful area,
positioning the useful area in the lens where the useful area divides the top area into a top outer area and a top inner area, and the bottom area into a bottom outer area and a bottom inner area,
redistributing at least one of the lateral aberrations on the lens around the outer area allowing, at least in one of the top outer and bottom outer areas, values to be adopted that are higher than those on the predesigned lens; and
defining an ellipse of vision.

17. Finished progressive ophthalmic lens, comprising:
a far vision area, a near vision area and a passage that extends between said far vision area and said near vision area,
wherein between said far vision area and a top edge of said lens there extends a top area and between said near vision area and a bottom edge of said lens there extends a bottom area;
a useful area, defined according to a perimeter of a preselected frame, and an area between the perimeter and an outer area outside the useful area, where said useful area divides said top area into a top outer area and a top inner area and said bottom area into a bottom outer area and a bottom inner area, wherein at least one of said top outer and bottom outer areas there is a lens power progression associated astigmatism greater than 0.25 Dp,
wherein the top inner and bottom inner areas have a lens power progression associated astigmatism less than 0.12.

18. The lens according to claim 17, wherein said top inner and bottom inner areas have a lens power progression associated astigmatism less than 0.06.

* * * * *